United States Patent [19]
Ramberg et al.

[11] 4,048,850
[45] Sept. 20, 1977

[54] MECHANISM FOR GAUGING THE CATCH WITHIN A TRAWL NET

[75] Inventors: Kjell Øystein Ramberg; Björn Kirknes, both of Horten, Norway

[73] Assignee: Simrad A.S., Norway

[21] Appl. No.: 730,479

[22] Filed: Oct. 7, 1976

[30] Foreign Application Priority Data

Oct. 8, 1975  Norway ............................... 753403

[51] Int. Cl.² .............................................. G01L 5/00
[52] U.S. Cl. .................................... 73/133 R; 73/143; 340/272
[58] Field of Search .................... 73/133, 141 A, 143, 73/144, 88.5 R; 340/272; 200/85 R; 177/132

[56] References Cited

U.S. PATENT DOCUMENTS

| | | | |
|---|---|---|---|
| 2,079,021 | 5/1937 | Malcolm et al. | 73/143 |
| 3,438,249 | 4/1969 | Fukunaga | 73/141 A X |
| 3,683,355 | 8/1972 | Collins | 73/141 A X |
| 3,759,094 | 9/1973 | Al | 73/143 |

OTHER PUBLICATIONS

W. C. Dillon & Co., Inc. Bulletin R-8, Nov. 1962, pp. 13-15.

*Primary Examiner*—Charles A. Ruehl
*Attorney, Agent, or Firm*—Watson, Cole, Grindle & Watson

[57] ABSTRACT

The present invention is related to a mechanism for guaging the expansion of a trawl net in correspondence with the number of fish caught within the trawl. The mechanism includes sensors adapted to be fastened to the masks of the trawl net in order to sense changes in the geometry of the mask. Each sensor includes a permanent magnet and a reed contact disposed to be activated by the magent as a result of a predetermined trawl net expansion, thereby transmitting a signal indicative of such expansion to a detection and indication mechanism located on board an associated trawler.

9 Claims, 8 Drawing Figures

MECHANISM FOR GAUGING THE CATCH WITHIN A TRAWL NET

BACKGROUND OF THE INVENTION

The present invention relates to a mechanism for gauging the catch of fish present within a trawl net.

In order to optimize trawl fishing it has been a long standing desire to be able to measure the amount of fish actually caught in the net, and to do this while the trawl is in actual operation. At the present time the usual procedure is to tow the trawl for about 4 hours at a time, while the actual launching of the trawl takes half an hour and the heave on board again another half hour. Considering the non-fishing part of the operation being that long, it is usually desirable to heave a full trawl net each time.

On the other hand, the net must not be too full before heaving. This applies in particular to deep sea operation, since the swim bladder of the caught fish will greatly extended during the heave to the surface. Many cases are known where the net has burst due to the heavy pressure resulting in loss of catch and great damage to the equipment. Proper means for gauging the catch during tow will indicate the correct time for starting to heave.

Such a gauge mechanism may also indicate whether the net has been damaged or possibly torn to pieces. If no catch is indicated in spite of ample prior echo-sounding or sonar registrations, the net may no longer be intact and the fish may be lost. Should the net turn out to be in proper condition, the original echo indications were presumably not of fish, but might have been sound reflections from plankton, roe, or some other type of reflective material.

Such mechanism to gauge the catch will also serve to facilitate adaption of the size of the catches to the processing facilities on board, thus avoiding excessive storage of raw fish.

Numerous procedures have been proposed for gauging the extent of fill or the size of the catch within the net of a trawl. One such procedure includes echo sounding of the trawl net from a transducer mounted near the front of the trawl, in the direction of the far end of the net, thus obtaining echo signals from the catch. The distance indicated by such signals will then be a measure of the size of the catch. Another method is based upon the idea that fish caught in the net will activate pressure switches mounted at strategic locations in the net. Further, it has been suggested to utilize the variable resistance between two electrodes mounted within the net as indication of the extent of fill. Detection of reflection of a beam of light has also been proposed to indicate whether fish are present in the net.

It is not known if any of the above proposals have been reduced to practice in a manner suitable for commercial fishing operations.

SUMMARY OF THE INVENTION

The gauge mechanism according to the present invention, however, has actually been tried out during regular trawling, with bottom trawl as well as with floating trawl, with very good results. The gauge mechanism according to the present invention generally includes at least one sensor disposed to sense changes in the geometry of the net. The sensor is connected with and adapted to control a modulator disposed and designed to actuate a transmitter to produce a modulated signal. The output of the transmitter is coupled to a transmission channel for transmission of the modulated signal to a receiver which is adapted for detection of the signal as an indication of the state of the sensor and controls an indicator in accordance with the detected signal.

In a preferred embodiment, each sensor is disposed to span more than one mask of the trawl net. The sensor includes an approximately elliptic ring of flexible material, which ring is internally provided with cooperating permanent magnet and reed contact, respectively, and is externally provided with a fastening mechanism at the respective ends of the minor elliptic axis. The reed contact is disposed in relation to the cooperating permanent magnet that activation of the reed contact occurs with increasing distance between the contact and the magnet, i.e. with extension of the minor elliptic axis. An exemplified embodiment of the invention will in the following be described with reference to the drawings.

DESCRIPTION OF THE PREFERRED EMBODIMENT

Figure 1:
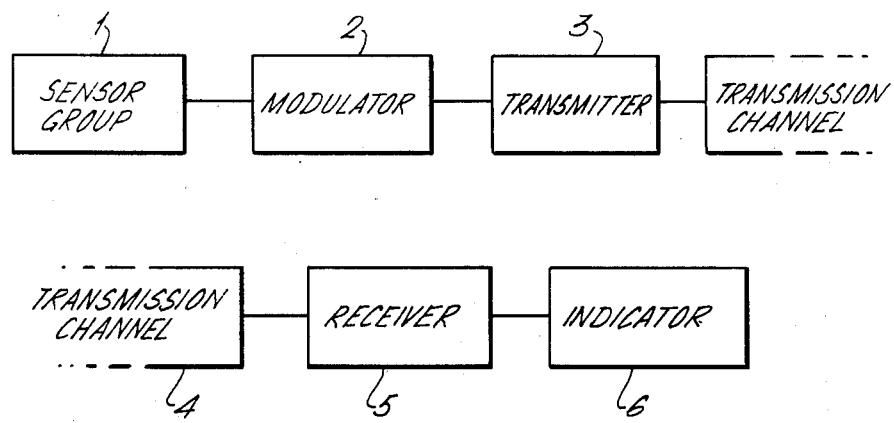
FIG. 1 is a general block diagram of mechanism for gauging the catch within a trawl net, according to the invention.

As shown by FIG. 1, the present embodiment of the mechanism for gauging a trawl catch includes a group of sensors 1 mounted at suitable locations on the net of the trawl. The sensors are coupled to a modulator 2 which in turn modulates a transmitter 3 in accordance with the state of the sensors.

In the preferred embodiment, the sensors are designed to switch resistors into and out of a control circuit of the modulator 2. The duration of a pulse train from the modulator is determined by the total resistance present in the circuit, thus establishing a connection between the state of the sensors and the number of pulses in each train. These pulse trains modulate the carrier wave of transmitter 3, which is signalling to a receiver 5 and an indicator 6 on board an associated trawler by means of a suitable transmission channel 4, which may be telemetry or cable channel. Echo sounding or sonar equipment may be used as the receiver, with the indicator 6 being the recorder or loudspeaker of such equipment. However, a separate indicator for the trawl gauge means may also be used. In a practical test embodiment of the invention an acoustic telemetry channel was used with the sonar equipment of the trawler serving as receiver and indicator.

Figure 2:
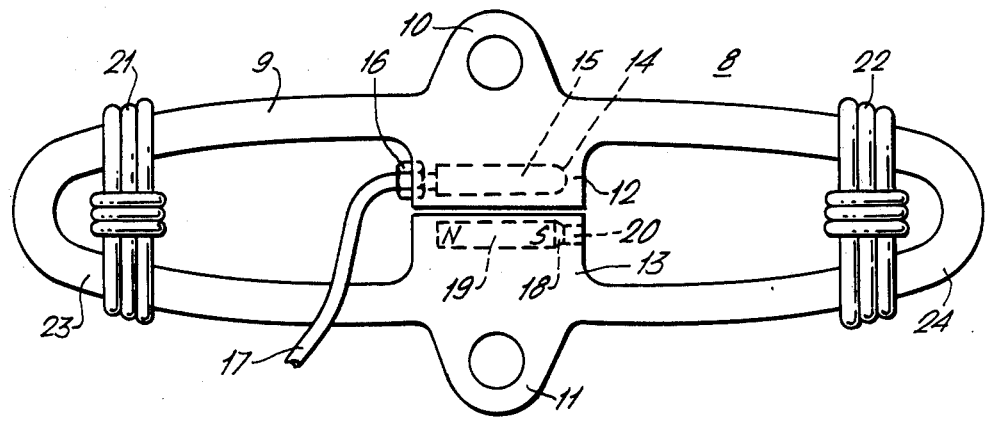
FIG. 2 is a sketch showing one of the sensors employed by such means.

A preferred embodiment of a sensor 8 is shown in FIG. 2. It consists of an approximately elliptic ring 9 equipped with two external lugs or ears 10 and 11, one at each end of the minor axis of the ellipse. The lugs 10 and 11 are integrally casted with the ring 9 itself, which also is provided with two heavy integral inward extensions 12 and 13 along the minor axis. Extension 12 contains a cylindrical chamber 14 for a reed contact 15 which is fixed in place by a threaded nipple 16 closing the entrance to chamber 14, except for the electrical lead connection 17 to the reed contact 15. The other extension 13 is provided with a chamber 18 containing a permanent magnet 19, and is similarly closed by a threaded plug 20 which also fixes the magnet 19. On the ring 9, near the ends of its major axis, there are lashings 21 and 22, limiting the length of the ring which is free to move by pulling on the lugs 10 and 11, as well as providing another pair of ears 23 and 24 for fastening the ring to the masks of a trawl net.

The ring is cast from Adiprene, a plastic material. Its stiffness determines the force required on the lugs 10 and 11 to separate the magnet 19 and the reed contact 15 sufficiently in order to change the state of the reed contact. Furthermore, the location of the lashings 21 and 22 may be changed to vary the magnitude of the required force, which is increased when the lashings are placed closer together. The sensitivity of the sensor 8 may thus be varied by moving the lashings 21 and 22.

Figure 3:
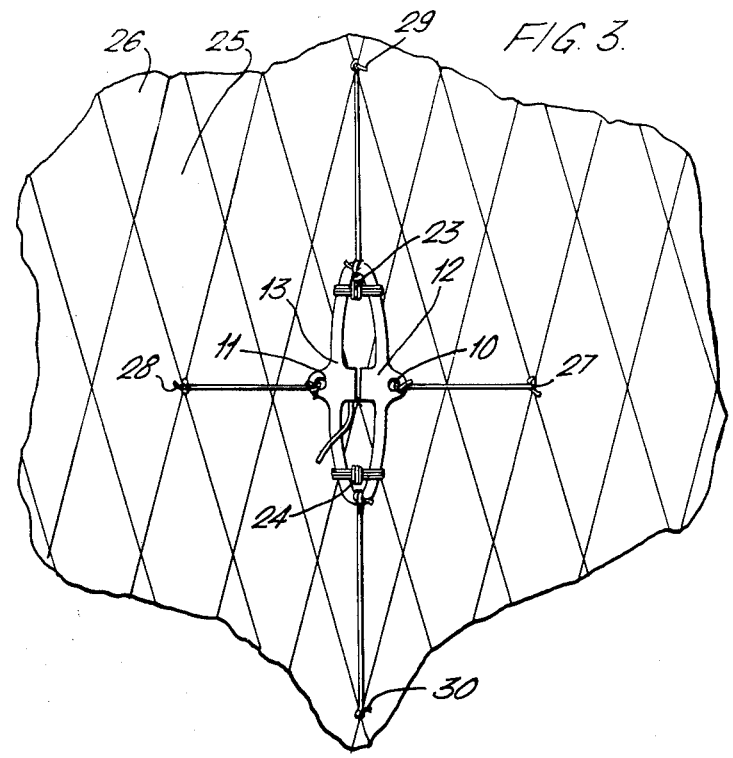
FIG. 3 shows the sensor mounted on a section of an empty trawl net.

As shown in FIG. 3, the sensor 8 is fixed to the trawl net 26 by strings, spanning a number of masks 25 of the net, only part of the net 26 being shown, and the net being empty. The ears 23 and 24 are lined up longitudinally with respect to the trawl, whereas the ears 10 and 11 are transversely directed. The masks are rather long and the inward extensions 12 and 13 on the sensor 8 bear against each other when the net is empty. Strings connect the ears to knots on the net, 29 and 30, 27 and 28, respectively.

As the trawl fills with fish, the geometry of the masks will change. The masks will thus gradually become shorter and wider, due to the fish expanding the net sidewise.

Figure 4:
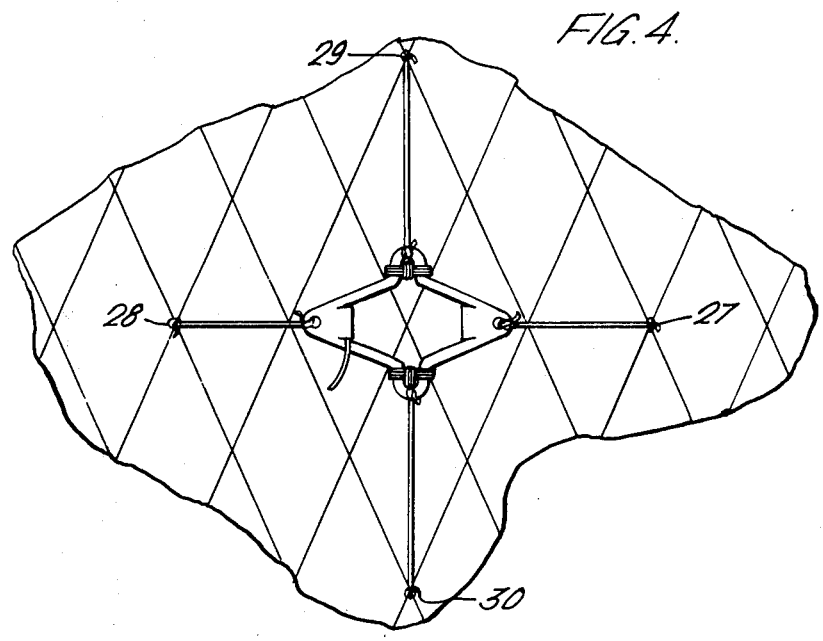
FIG. 4 shows this sensor extended by the action of a full net.

As shown in FIG. 4, the sensor largely conforms to the movements of the knots of the net. When the masks grow wider, the distance between knots 27 and 28 increases, while knots 29 and 30 come close together. When the expanding force of the fish caught in the net exceeds a certain level, the magnet 19 will be pulled so far away from the reed contact 15 that the magnetic field at the reeds of the reed contact will not be sufficient to maintain their mutual contact thereby causing the reed contact will open. The change of state of the reed contact will be sensed through the electrical connection 17 and indicates that sufficient fish are present at the level of the sensor in question to allow the activation of the sensor.

Placing a number of sensors along the length of the trawl net, it will thus be possible to determine the size of the fish catch by detecting the sensors which have been activated.

Figure 5:
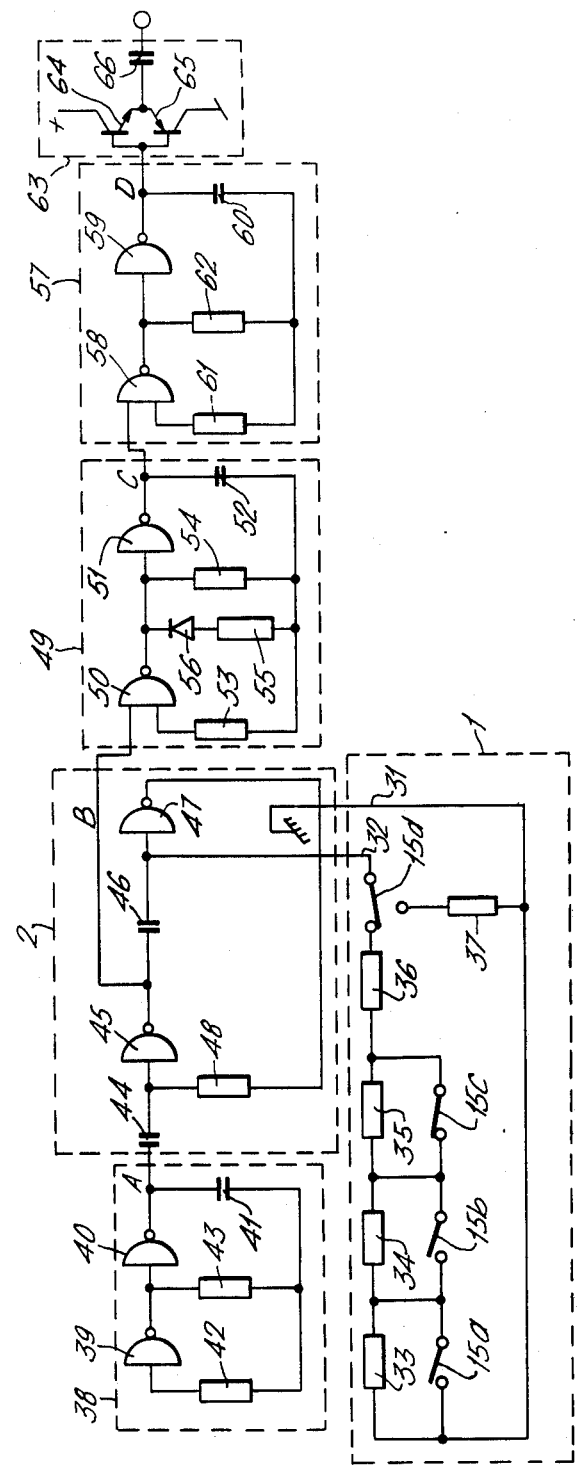
FIG. 5 is a circuit diagram of the electronic equipment actually located on the trawl.

FIG. 5 shows a circuit diagram of the sensor group 1, the modulator 2, and the transmitter 3 of FIG. 1. Within block 1 in FIG. 5 four individual reed contacts 15 are shown. Two wires 31 and 32 connect this block with the modulator block 2. Within the sensor block, wire 31 is connected to one end of a series of three resistors 33, 34, and 35, each of which is connected in parallel with a reed contact 15a, 15b and 15c. Each of these reed contacts 15a, 15b and 15c is associated with a different sensor 8. A further resistor 36 is connected in series with said three resistors and is connectable to a wire 32 through one contact of a change-over reed switch 15d. This change-over switch 15d is disposed to connect wire 32 either to resistor 36, or to wire 31 through a further resistor 37. In other words, the reed switch 15d may bypass all other reed contacts and is used to indicate that the trawl net is full of fish for this purpose switch 15d would be associated to a sensor mounted close to the open end of the net.

The total resistance presented by the sensor block 1 between the wires 31 and 32 will depend upon the state of the four reed contacts shown and will in turn determine the pulse length of a monostable multivibrator of modulator 2. This multivibrator is triggered from a timing circuit 38, which is a conventional stable multivibrator circuit and determines the rate at which measurements are taken. This circuit includes two inverters 39 and 40 connected in series with a capacitor 41 and a resistor 42. The common point of the latter is connected with the common point of the inverters through a resistor 43. These inverters 39 and 40 as well as all other inverters and gates on FIG. 5 are constituted in known manner by double-input NAND-gates. Two integrated circuits of the type CD4011 from RCA are included in the circuit of FIG. 5.

The output A from the timing circuit 38 is connected to a capacitor 44 in the modulator 2. The capacitor 44 serves as an input to the series connection of an inverter 45, another capacitor 46, and a further inverter 47. The output of inverter 47 is fed back to the input of inverter 45 through a resistor 48. The output (B) from the modulator is taken from the output side on the first inverter 45. The resistance presented by the sensor block 1 through the wires 31 and 32, is connected between the input to the second inverter 47 and ground wire 31 being the grounded wire.

The output of the modulator 2 controls a pulse generator 49 which emits pulses when output (B) is in the high signal state. Output B feeds into one output of a NAND-gate 50 in the pulse generator 49, the output of NAND-gate 50 feeds into an inverter 51, and the output (C) is fed back to the other input to the NAND-gate 50 through a capacitor 52 and a resistor 53 in series. The common point of the latter is connected to the input to the inverter 51 through a resistor 54 in parallel with a series connection of a diode 56 and another resistor 55. The pulse generator 49 produces a train of short pulses at relatively large intervals, when it is activated by the modulator 2. The output C of the generator controls a carrier frequency oscillator 57, where the output drives NAND-gate 58 in series with an inverter 59. The output D from the inverter 59 is fed back to the other input of the NAND-gate 58 through a capacitor 60 and a resistor 61. The common point of the latter is connected to the input to the inverter 59 through another resistor 62. The output signal from the carrier frequency oscillator 57 at the output D of the inverter 59 will be a pulse modulated carrier frequency, and is fed into an amplifier 63, which simply consists of two complementary transistors coupled with common emitters on the output side, and common bases on the input side. The collector of the NPN transistor 64 is connected to the positive supply terminal, and the collector of the PNP transistor 65 is connected with ground. A capacitor 66 connects the amplifier output to the transmission channel. Alternative embodiments of the amplifier 63 may be used which will be known to a person skilled in the art.

Figure 6:
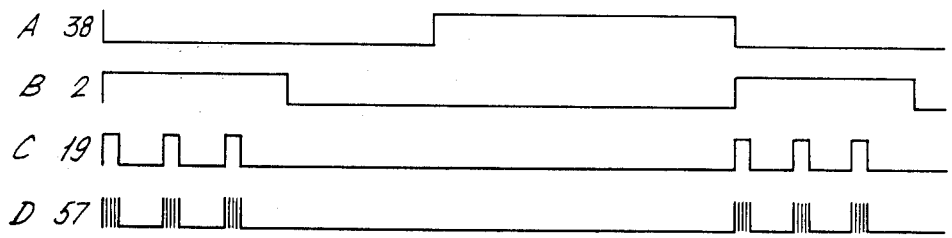
FIG. 6 is a pulse diagram indicating the operation of the circuit in FIG. 5.

The mode of operation of the circuit of FIG. 5 will now be described with reference to FIG. 6. The individual circuits in the blocks will not be further discussed, since such circuits will be generally known from the professional literature, for example from "CMOS/MOS Integrated Circuits Manual" issued by RCA.

The timing circuit 38 generates a square wave A at about 1 Hz. The monostable modulator 2 will be triggered by the negatively going flank of the square wave. The duration of the associated positive pulse at the output B will depend upon the resistance between the input to inverter 47 and ground. When the output B from the modulator 2 attains a high signal level, the pulse generator 49 will be switched on. The emitted pulses C from said generator are widely spaced. The resistors in the sensor group 1 have been chosen to etablish a definite relationship between the number of pulses in each pulse train at C and the number of open reed contacts (activated sensors). With no contact open, resistor 36 will cause pulse B to be very short, and only one pulse will be emitted at the output C. If contact 15a is opened, however, the pulse B will be lengthend, and two pulses will be emitte d at C. Similarly, there will be emitted three pulses at C, when contacts 15a and 15b are open, and four pulses when 15a, 15b and 15c are open.

When the fourth reed switch 15d is activated, the above string of resistors will be replaced by a single large resistor 37. Pulse B will consequently be even longer, and five pulses will be emitted from C during each period A. Five pulses thus definitely indicate that the switch 15d has been activated (opened), and one single pulse that no contact at all has been activated. The emission of two, three or four pulses represent, however, a certain ambiguity with respect to which additional contacts have been activated, although not as to how many. Reed switch 15d may be mounted to indicate full catch, and may serve as an added safety factor for full trawl, if some of the other contacts should fail, thus avoiding bursting the net when heaving the trawl on board.

The output C from the pulse generator 49 controls the carrier frequency oscillator 57, which emits the transmitted carrier when the output C is at high signal level.

The output D from the oscillator 57 is amplified in the amplifier 63 before transmission to the associated trawler along the transmission channel 4.

The transmission channel 4 may be included in a cable between the trawl and the trawler, such as employed by the SIMRAD Trawleye System, or an acoustic link as used in the SIMRAD Trawleye System. In the latter case the transmitter of the trawl gauge mechanism drives an electroacoustic transducer being directed from the trawl towards the trawler. Onboard the vessel the sonar transducer used for fish search or a separate transducer assigned to the trawl gauge, may be utilized for receiving the signals from the trawl. This transducer feeds the received signals to the receiver 5, FIG. 1. If the sonar transducer is used, the sonar associated receiver may of course preferably be used for detecting information from the trawl gauge. The pulse trains emitted from the trawl may easily be identified acoustically by the sonar loudspeaker, and visually on the sonar recorder. When a separate transducer for the gauge is used, the signal received may still be fed to the sonar or the echo sounder receiver by suitable switching between the corresponding transducers. If the echo sounding receiver is used, the gauge transducer may be switched to the echo sounder receiver when the pen of the echo recorder is not touching the paper, and a loudspeaker output may then be utilized. The trawl gauge will then only provide acoustic indications.

Evidently, a separate receiver may alternatively be employed for the trawl gauge, and including separate displays, which may be acoustic or optical, or both.

If the trawl gauge is connected with the SIMRAD Trawleye System, the use of displays included in the sytem will be natural.

Figure 7:
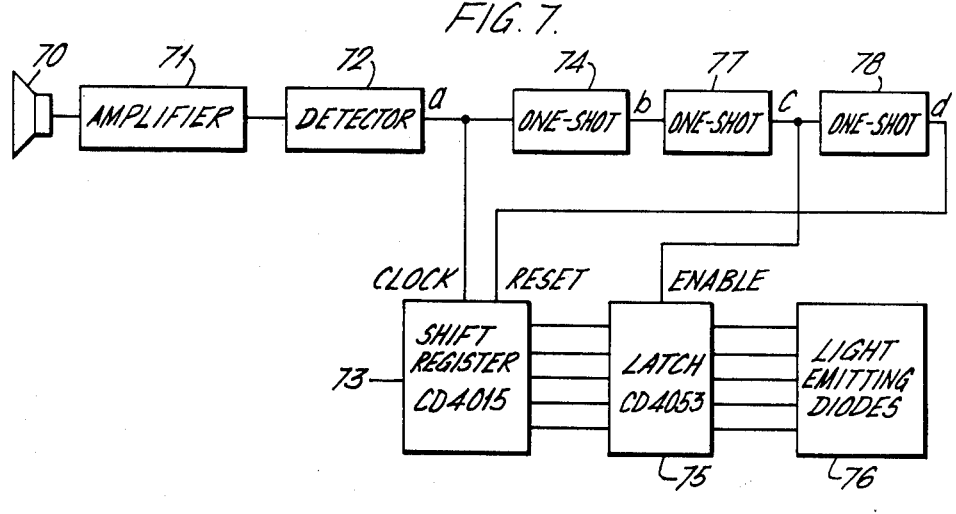
FIG. 7 is a block diagram of the receiver included in the present gauge mechanism.

FIG. 7 shows how the receiver and the indicator may be designed. A transducer 70 receives the sound waves from the transmission channel, and converts the sound signals to electric signals. These are amplified in amplifier 71, and the envelope of the signals detected by the detector 72. The latter may advantageously include a pulse shaping network (not shown) to emit pure square waves.

The output A of the detector 72 is connected to the clock input of a shift register 73 and to the input of a monostable multivibrator (one-shot) 74, the pulse length of which is somewhat longer than half the period set by the timing circuit 38 of the trawl gauge.

The shift register is a series input/parallel output register having its parallel output connected to a latch circuit 75. This latch circuit selectively drives a group of light emitting diodes 76.

The output from the monostable multivibrator (one-shot) 74 is connected to another such multivibrator 77, which is triggered by the rear flank of the pulse 6 from the multivibrator 74. The output c of the multivibrator 77 is connected with the "enable" input of the latch 75 as well as the input of a further monostable multivibrator 78, which is triggered by the rear flank of the pulse from the multivibrator 77. The output d from the multivibrator 78 is connected with the "reset" input on the shift register 73.

The mode of operation of the circuit of FIG. 7 will be described with reference to FIG. 8, which is a sequence diagram for the digital part of the circuits of FIG. 7. The sound pulses received from the sea are converted by the transducer 70 and amplified by the amplifier 71. The detector 72 detects the envelope for the pulses, and emits a pulse train through the pulse forming network, the number of pulses in the train a in FIG. 8, depending on the number of activated sensors present on the trawl net.

Figure 8:
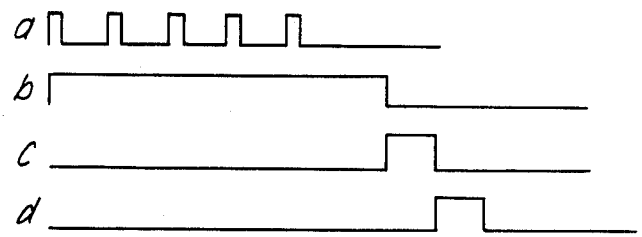
FIG. 8 is a pulse diagram showing the operation of the receiver in FIG. 7.

FIG. 8 indicates full trawl (five pulses). These pulses are clocked into the shift register 73. The first pulse of the train triggers the multivibrator 74, which emits a pulse b with a duration longer than the pulse train a. The rear flank of pulse b triggers the multivibrator 77, which in turn emits a pulse c to the "enable" input of the latch 75. This accomplishes the transfer of the content of the shift register 73 to the latch 75. The latch selectively drives the light emitting diode array 76, which displays which bits in the latch have been set at a high signal level. The diode array 76 thus indicates the number of pulses received by the shift register 73, that is the number of sensors on the trawl which have been activated. The rear flank of pulse c triggers the monostable multivibrator 78, which emits a pulse d for resetting the shift register 73 which thus is ready to receive the next pulse train.

We claim:

1. Apparatus for gauging the catch within a trawl net comprising:
   at least one sensor disposed to sense a change in the geometry of the trawl net and providing an output signal indicative of such change;

a modulator receiving the output signals from said sensor and in response thereto generating a modulated signal;

a transmitter coupled to said modulator for receiving the modulated signal and transmitting such signal;

a receiver detecting the transmitted signal as an indication of the state of said sensor; and an indicator coupled to said receiver and providing an indication of the state of said sensor.

2. Apparatus as defined in claim 1 further comprising a transmission channel coupled between said transmitter and said receiver for transferring the transmitted signal.

3. Apparatus as defined in claim 1 wherein said sensor senses a change in the mask geometry of the trawl net.

4. Apparatus as defined in claim 3 wherein said sensor is arranged on the trawl net in such a manner as to span more than one mask of the trawl net.

5. Apparatus as defined in claim 1 wherein said sensor includes an approximately elliptical ring of flexible material, said ring is internally provided with a permanent magnet and a reed switch arranged in such a manner so as to act in cooperation with each other, and said ring has an external fastening means at the respective ends of its minor elliptical axis, said reed switch being disposed in relation to said cooperating permanent magnet such that said reed switch changes state with increasing distance between said reed switch and said magnet upon expansion of the minor elliptical axis of said ring.

6. Apparatus as defined in claim 1 wherein there are a plurality of sensors, each being activated in dependence upon a different change in the geometry of the trawl net and said modulator is coupled to each of said sensors and emits a number of pulses corresponding to the number of activated sensors.

7. Apparatus as defined in claim 6 wherein at least one of said sensors is connected to said modulator in such a manner for allowing individual identification upon activation of said one sensor.

8. Apparatus as defined in claim 7 wherein said sensors are arranged in a sensor group and each sensor of said sensor group has associated therewith a corresponding resistor, said resistors being coupled together in such a manner that when each of said sensors is activated the corresponding resistors of said activated sensors are connected in series.

9. Apparatus as defined in claim 8 further comprising a single resistor and a changeover switch wherein said individually identifiable sensor upon being activated causes said changeover switch to replace said series connection of said resistors with said single resistor having a resistance value higher than the total resistance values of said series connection of said resistors.

* * * * *